(12) United States Patent
Krasner et al.

(10) Patent No.: US 10,852,954 B1
(45) Date of Patent: Dec. 1, 2020

(54) RUNNING AN ENTERPRISE STORAGE SUBSYSTEM AS A VIRTUAL MACHINE

(71) Applicant: EMC Corporation, Hopkinton, MA (US)

(72) Inventors: Jonathan Krasner, Coventry, RI (US); Chakib Ouarraoui, Watertown, MA (US); Matt Fredette, Belmont, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 727 days.

(21) Appl. No.: 14/862,491

(22) Filed: Sep. 23, 2015

(51) Int. Cl.
*G06F 3/06* (2006.01)
*G06F 13/40* (2006.01)
*G06F 13/28* (2006.01)
*G06F 9/455* (2018.01)

(52) U.S. Cl.
CPC .......... *G06F 3/0619* (2013.01); *G06F 3/0665* (2013.01); *G06F 3/0689* (2013.01); *G06F 9/45545* (2013.01); *G06F 13/28* (2013.01); *G06F 13/4022* (2013.01)

(58) Field of Classification Search
CPC .. G06F 3/0619; G06F 13/4022; G06F 3/0665; G06F 3/0689; G06F 9/45545; G06F 13/28
See application file for complete search history.

(56) References Cited

U.S. PATENT DOCUMENTS

| | | | | |
|---|---|---|---|---|
| 8,819,647 B2* | 8/2014 | Mitran | ............... | G06F 9/45504 717/136 |
| 2008/0307213 A1* | 12/2008 | Sekiguchi | ........... | G06F 9/45558 713/1 |
| 2010/0275058 A1* | 10/2010 | Hashimoto | ........... | G06F 9/5077 714/6.13 |
| 2011/0154318 A1* | 6/2011 | Oshins | ............... | G06F 9/45537 718/1 |
| 2011/0239213 A1* | 9/2011 | Aswani | ............... | G06F 9/45558 718/1 |

* cited by examiner

*Primary Examiner* — William B Partridge
*Assistant Examiner* — Alan Otto
(74) *Attorney, Agent, or Firm* — Anderson Gorecki LLP

(57) ABSTRACT

A storage array is implemented as a virtual machine on a server. The virtual storage array includes a virtual engine with virtual directors and virtualized processor and memory resources. Embedded storage software converts Input/Output requests into Input/Output requests that can be serviced by the virtual machine. A virtual backend driver enables the virtual storage directors to access a set of virtual drives. A virtualized shared memory driver provides emulated input/output, XOR, direct memory access and copy services for send and receive threads.

20 Claims, 4 Drawing Sheets

RUNNING AN ENTERPRISE STORAGE SUBSYSTEM AS A VIRTUAL MACHINE

BACKGROUND

Aspects of this disclosure are generally related to data storage systems which can be used to maintain relatively large data sets and support a relatively large number of concurrent users. A basic building block of a data storage system may include a storage subsystem such as a storage array. Examples of storage arrays include the Symmetrix family of data storage products of EMC Corporation. A data center may include multiple storage arrays. Multiple data centers may be used to implement a distributed and geographically diverse storage system.

SUMMARY

All examples, aspects and features mentioned in this document can be combined in any technically possible way.

In accordance with an aspect, an apparatus comprises: a computing node comprising at least one processor and a non-transitory computer-readable memory on which is stored program code configured to be run by the at least one processor to generate: a virtual storage array comprising at least one virtual storage engine, the virtual storage engine comprising a pair of virtual storage directors, each virtual storage director comprising a virtual processor, a virtualized shared memory, a virtual backend adapter configured to interface with a data storage device, the pair of virtual storage directors being interconnected via a virtual switch. In some implementations each virtual storage director further comprises a virtual channel adapter with virtual ports which interface with the virtual switch using Ethernet protocol. In some implementations the virtual storage array further comprises a virtual front end adapter configured to interface the virtual storage directors with an external device and a guest operating system hosted by the virtual storage array. In some implementations the virtual front end adapter implements internet small computer system interface protocol. In some implementations the computing node processor comprises a central processing unit and a graphics processing unit. In some implementations the virtual storage array further comprises a backend driver configured to enable the virtual storage directors to access a set of virtual drives. In some implementations the virtual drives are mounted on paravirtualized small computer system interface devices. In some implementations the virtual drives are an abstraction layer between the virtual storage directors and a set of physical data storage devices. In some implementations the virtual storage array further comprises a virtualized shared memory driver which provides direct memory access functionality between the virtualized shared memory allocated to the virtual storage directors. In some implementations the virtualized shared memory driver provides emulated input/output, XOR, direct memory access and copy services for send and receive threads.

In accordance with an aspect a method comprises: using a computing node comprising at least one processor and a non-transitory computer-readable memory on which is stored program code configured to be run by the at least one processor: generating a virtual storage array comprising at least one virtual storage engine, the virtual storage engine comprising a pair of virtual storage directors, each virtual storage director comprising a virtual processor, a virtualized shared memory, a virtual backend adapter configured to interface with a data storage device; and interconnecting the pair of virtual storage directors via a virtual switch. In some implementations each virtual storage director further comprises a virtual channel adapter with virtual ports, and the method comprises interfacing the virtual storage directors with the virtual switch via the virtual ports using Ethernet protocol. In some implementations the virtual storage array further comprises a virtual front end adapter, and the method comprises interfacing the virtual storage directors with an external device and a guest operating system hosted by the virtual storage array via the virtual front end adapter. In some implementations the method comprises the virtual front end adapter implementing internet small computer system interface protocol. In some implementations the computing node processor comprises a central processing unit and a graphics processing unit. In some implementations the virtual storage array further comprises a backend driver, and the method comprises the backend driver enabling the virtual storage directors to access a set of virtual drives. In some implementations the method comprises mounting the virtual drives on paravirtualized small computer system interface devices. In some implementations the method comprises implementing the virtual drives as an abstraction layer between the virtual storage directors and a set of physical data storage devices. In some implementations the virtual storage array further comprises a virtualized shared memory driver, and the method comprises the virtualized shared memory driver providing direct memory access functionality between the virtualized shared memory allocated to the virtual storage directors. In some implementations the method comprises the virtualized shared memory driver providing emulated input/output, XOR, direct memory access and copy services for send and receive threads.

DETAILED DESCRIPTION

Some aspects, features and implementations may comprise computer components and computer-implemented steps or processes that will be apparent to those skilled in the art. It should be understood by one of ordinary skill in the art that the computer-implemented steps or processes may be stored as computer-executable instructions on a non-transitory computer-readable medium. Furthermore, it should be understood by one of ordinary skill in the art that the computer-executable instructions may be executed on a variety of physical processor devices. For ease of exposition, not every step, process or element is described herein as part of a computer system, but those of ordinary skill in the art will recognize steps, processes and elements that may have a corresponding computer system or software component. Such computer system and software components are therefore enabled by describing their corresponding steps, processes or elements, and are within the scope of the disclosure. When corresponding physical and non-physical elements are described herein, modifiers including but not limited to "logical," "virtual" and "emulated" are used to refer to non-physical elements and the absence of such modifiers is used to refer to corresponding physical elements. For example, a "logical device" is non-physical and a "device" is physical. It should also be understood that non-physical elements are not merely abstract concepts but rather are implemented with physical elements. For example, a logical storage device is backed by one or more physical storage devices where the logical storage device may represent a layer of abstraction between the logical device and the physical storage devices.

Figure 1:
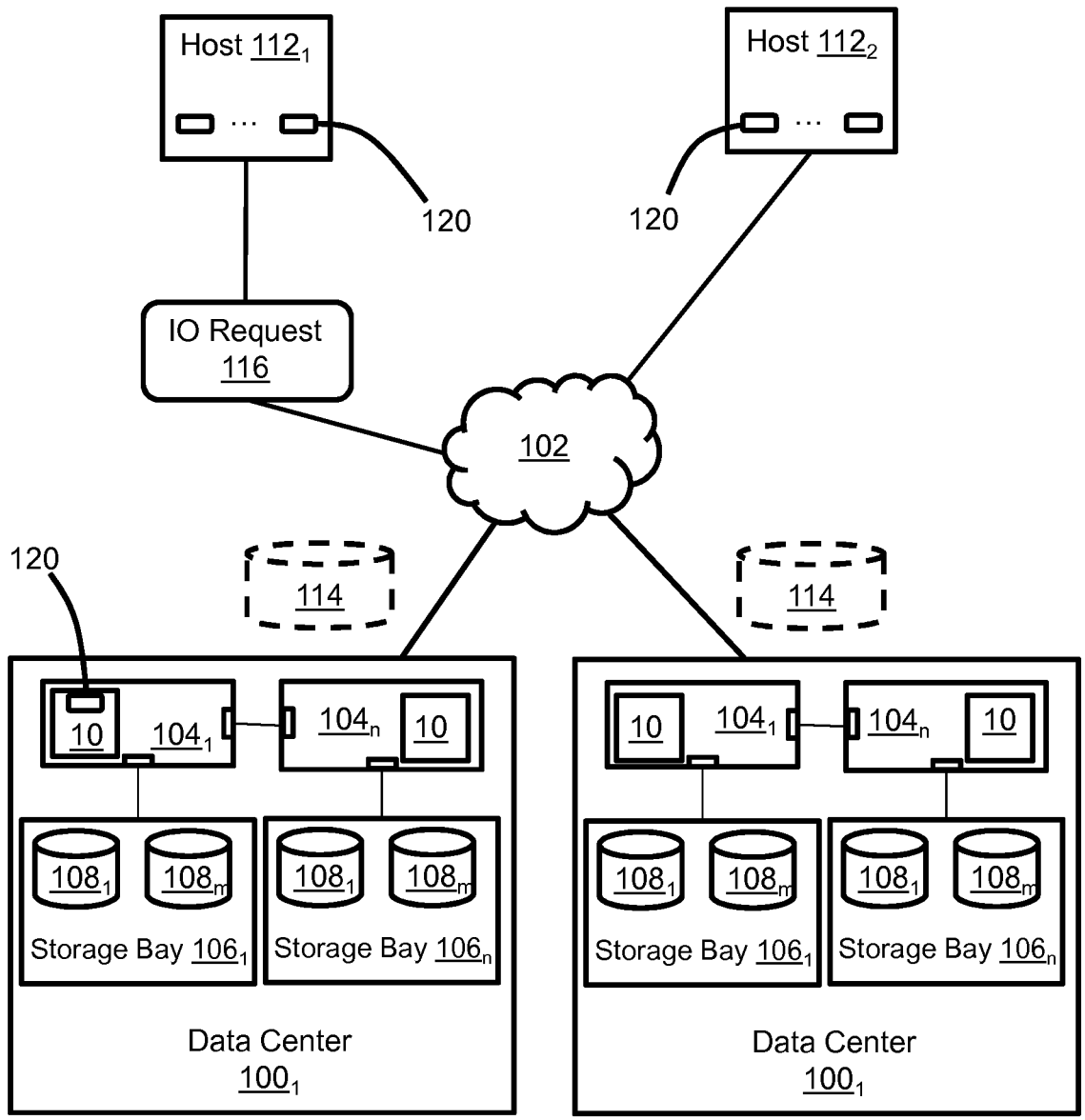
FIG. 1 illustrates a data storage system based on storage arrays running as virtual machines on computing nodes.

FIG. 1 illustrates a distributed data storage system that maintains data and supports IOs associated with a large number of concurrent users. The data storage system includes two or more data centers $100_1$, $100_2$ that are interconnected via a network 102. For context and without limitation the network 102 could be a WAN (wide area network) or MAN (metropolitan area network). Each data center $100_1$, $100_2$ includes one or more computing nodes such as servers $104_1$-$104_n$, which could be in racks or chassis for example and without limitation. Within a data center, each server is connected to each other server via point-to-point links. The servers $104_1$-$104_n$ are associated with corresponding storage bays $106_1$-$106_n$, each including multiple data storage devices $108_1$-$108_m$. The data storage devices $108_1$-$108_m$ may include pools of different types of non-volatile data storage devices which are organized in hierarchical tiers. For example and without limitation, the data storage devices may include a storage pool of flash drives at tier 0, a storage pool of FC (Fibre Channel) drives at tier 1, and a storage pool of SATA (serial advanced technology attachment) drives at tier 2.

Each server $104_1$-$104_n$ includes various resources including but not limited to processors and memory, and utilizes an OS (operating system). Those resources can be utilized to host one or more VMs (virtual machines) which are allocated a portion of the processor and memory resources and utilize guest OSs. A program such as a hypervisor may manage containers which limit each VM to the resources allocated to that VM. In the illustrated example each server hosts a storage array 10 as a VM. Each virtual storage array may include threads running in a separate container under the control of the hypervisor.

An external device such as a user terminal or server may use the data storage system by communicating with one of the external host devices $112_1$, $112_2$ which may be associated with the data storage system, e.g., via the network 102. Multiple external host devices may be associated with each data center, and each external host device may host any of a wide variety of applications. An exemplary external host device may be a type of server which hosts one or more instances of client applications 120 such as a database, file server or block server, for example and without limitation, for which the corresponding data is maintained by the data storage system. Hosted applications 120 may alternatively or additionally be operated on guest OSs within VMs on the servers $104_1$-$104_n$. The VMs and guest OSs utilize the processor and memory resources of the servers $104_1$-$104_n$ rather than the processor and memory resources of external host devices. However, the guest OSs may be different than, and independent of, the OS of the servers $104_1$-$104_n$. In the description below the guest OS and server OS are assumed to be heterogeneous. Operating applications on guest OSs may avoid communication latency associated with the network 102.

A communication between the external device and the instance of the application 120 may prompt a corresponding IO request. For example, an instance of application 120 on external host $112_1$ may send IO request 116 to one of the data centers $100_1$, $100_2$ in order to read or write data. Any of the servers $104_1$-$104_n$ can receive and process IO requests, e.g., by writing data to the physical storage devices or reading data from the physical storage devices and sending the data to the host. The application and the external host device will typically be unaware of the actual location of data on the physical storage devices $108_1$-$108_m$. The IO requests reference one or more locations in a logical storage device 114, of which there may be a plurality, e.g. and without limitation one per hosted client application. The data stored on each logical storage device may be distributed across multiple physical storage devices $108_1$-$108_m$ and possibly mirrored by each data center, and extents of data may be moved between physical storage devices in response to tiering decisions and other factors. Each virtual storage array 10 maintains directories with mappings between the logical storage device 114, shared memory, and the physical storage devices $108_1$-$108_m$. The mappings indicate which pages are in shared memory and where pages are located in backend storage. When data corresponding to an IO request is already in the shared memory, i.e., a "cache hit," then that cached copy of the data can be used to service the IO request without accessing back end storage. When the data being accessed is not already in the shared memory, i.e. a "cache miss," then that data is copied into the shared memory in order to service the IO request, e.g., copied into cache from back end storage in response to a read request.

Figure 2:
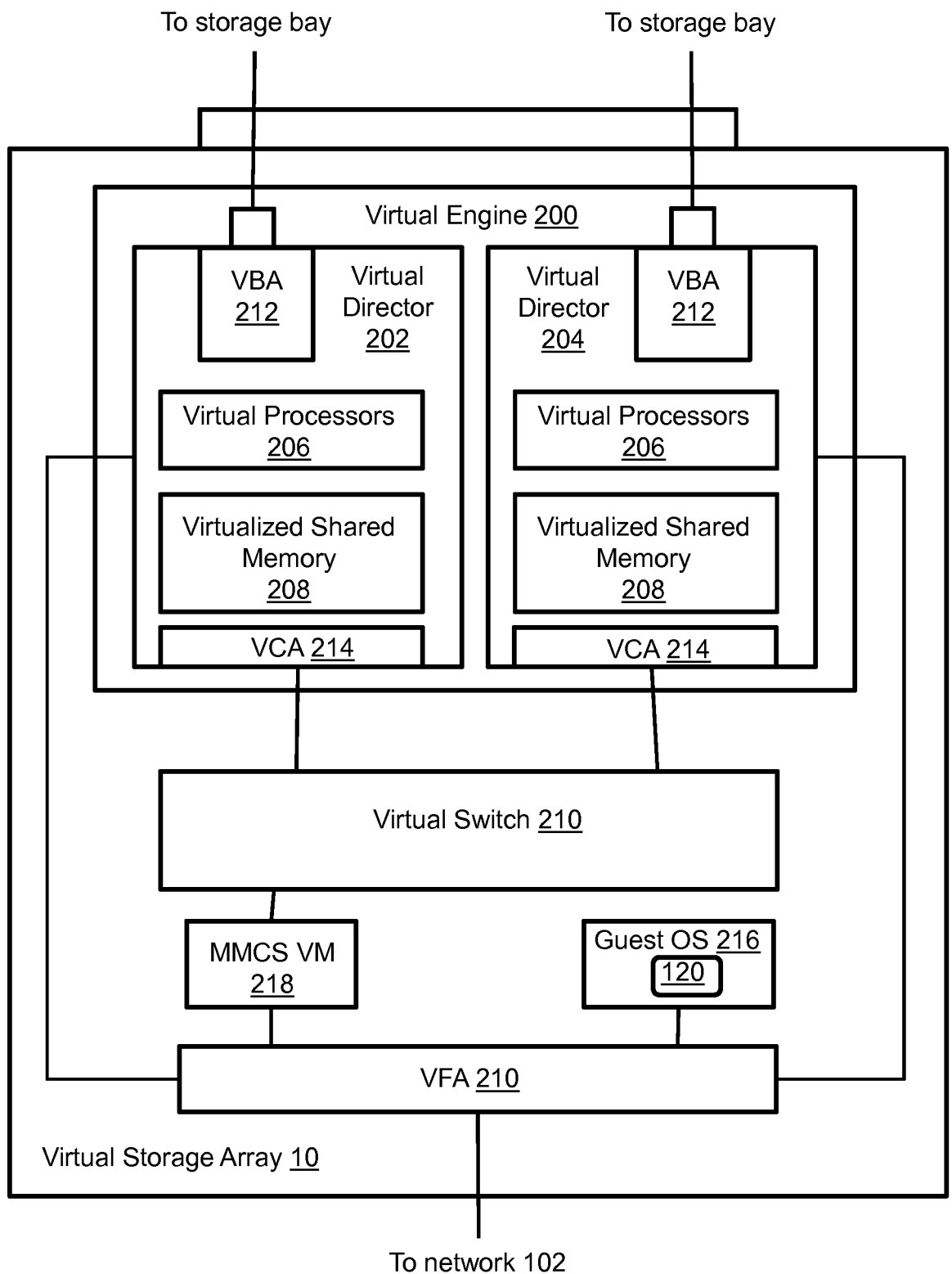
FIG. 2 illustrates an implementation of a virtual storage array.

FIG. 2 illustrates one possible implementation of a virtual storage array 10 in greater detail. Various virtual components are implemented and backed by the processor(s) and memory of the storage server. In the illustrated example the virtual storage array includes one virtual storage engine 200. However, multiple virtual storage engines could be implemented in the same virtual storage array. Each virtual storage engine 200 includes a pair of virtual storage directors 202, 204. Each virtual storage director includes virtual processor resources 206, a virtualized shared memory (cache) 208, a VBA (virtual back end adapter) 212, and a VCA (virtual channel adapter) 214, each of which may be implemented by a corresponding thread running on the storage server. The virtual processor resources 206 may include, for example and without limitation, virtual CPUs (central processing units) and virtual GPUs (graphics processing units) based on allocated cores of corresponding CPUs and GPUs of the storage server. The virtualized shared memory 208 could be backed by, for example and without limitation, volatile memory such as RAM (random access memory) of the storage server. A virtual switch 210 may provide point-to-point connectivity between the virtual directors 202, 204. The virtual switch may be implemented as a virtual Ethernet switch, although a wide variety of communications protocols could be implemented. A VFA (virtual front end adapter) 210 is configured to interface the virtual directors 202, 204 with external devices. The VFA also interconnects the virtual directors 202, 204 with a guest OS (virtual host) 216, including hosted application 120, and a MMCS VM (management module control station virtual machine) 218. The MMCS VM is also reachable via the virtual switch 110.

The virtual components enable the virtual storage array 10 to emulate operation of a physical storage array. The virtual processor resources 206 run a variety of threads on the instance of the virtual storage engine 200. The threads are configured to cause the virtual directors 202, 204 to perform IOs and other functions. The VBAs 212 interface with the back end physical storage devices of the associated storage bay in support of IOs and other functions. For example, the VBAs read data from and write data to the back end storage devices of the storage bay. Each VCA 214 may include one or more virtual ports, e.g. and without limitation, a pair of virtual Ethernet ports, via which other virtual directors of the same or other virtual storage engines of the same virtual storage array can be reached via the virtual switch 210. The virtualized shared memory 208 includes a cache slots section which is allocated for temporarily storing data that is being written to or read from the storage bay via the VBA 212. For example, data that is being written by an external or virtual host device is initially copied to the virtualized shared memory 208 and subsequently destaged to the storage bay. Data that is being read by an external host device or virtual host device is copied from the storage bay to virtualized shared memory 208 via the VBA and then provided to the external host or virtual host via the VFA. The VFA also helps to present the logical storage device 114 (FIG. 1) to external hosts and virtual hosts, receives IO requests from application instances 120, and provides data to external hosts and virtual hosts in response to read requests. Data may be also copied to the virtualized shared memory from the back end storage devices in response to a hint. Data may also be copied between virtualized shared memory of different virtual directors, e.g., via RDMA.

Each virtual director may host a plurality of different guest OSs 216, each of which may host instances of applications 120. For example and without limitation, multiple instances of the same guest OS and instances of different guest OSs may be hosted. The guest OSs may be different from the OS used by the virtual director, e.g., non-native or native but different. Each guest OS may be allocated a portion of the virtual processor resources 206 and virtualized shared memory 208. Together, the allocated virtual processor resources and memory represent a VM nested within the virtual storage array VM. The allocated processor virtual resources may be utilized in an emulation mode to provide logical CPU cores on which the guest OS and its hosted applications run. Execution of threads associated with different guest OSs is performed by different VMs using different logical cores. A hypervisor running on the VM within the virtual storage array VM manages sharing of the processor resources and memory resources among the guest OSs. For example, the hypervisor manages operation of guest OSs which are associated with virtual host applications by sharing the virtual processor resources and memory resources such that, from the perspective of each guest OS, the resources appear to be dedicated to that guest OS. Communications with both virtual hosts and external hosts via the VFA may utilize the iSCSI (internet small computer system interface) protocol.

Figure 3:
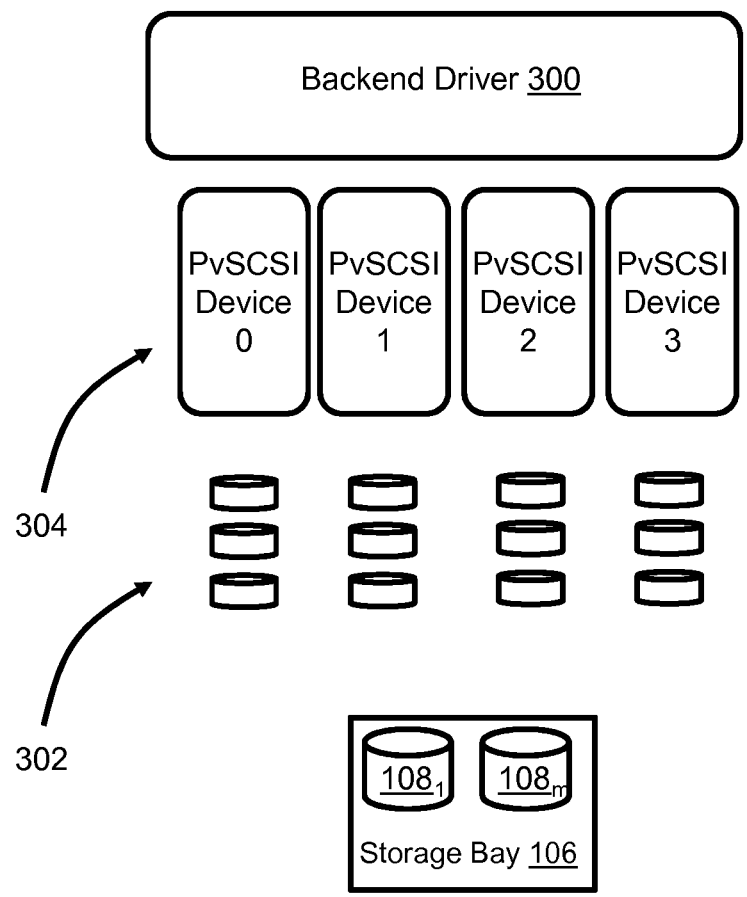
FIG. 3 illustrates backend virtualization.

Referring to FIG. 3, the VBA may include a backend driver 300 configured to enable access to a set of virtual drives 302. In the illustrated example the virtual drives 302 are mounted on four PvSCSI (Paravirtualized SCSI) devices 304 and the backend driver is a PvSCSI driver. Multiple virtual drives are on each PvSCSI device. The virtual drives 302 are an abstraction layer between the virtual director and the storage bay 106.

Figure 4:
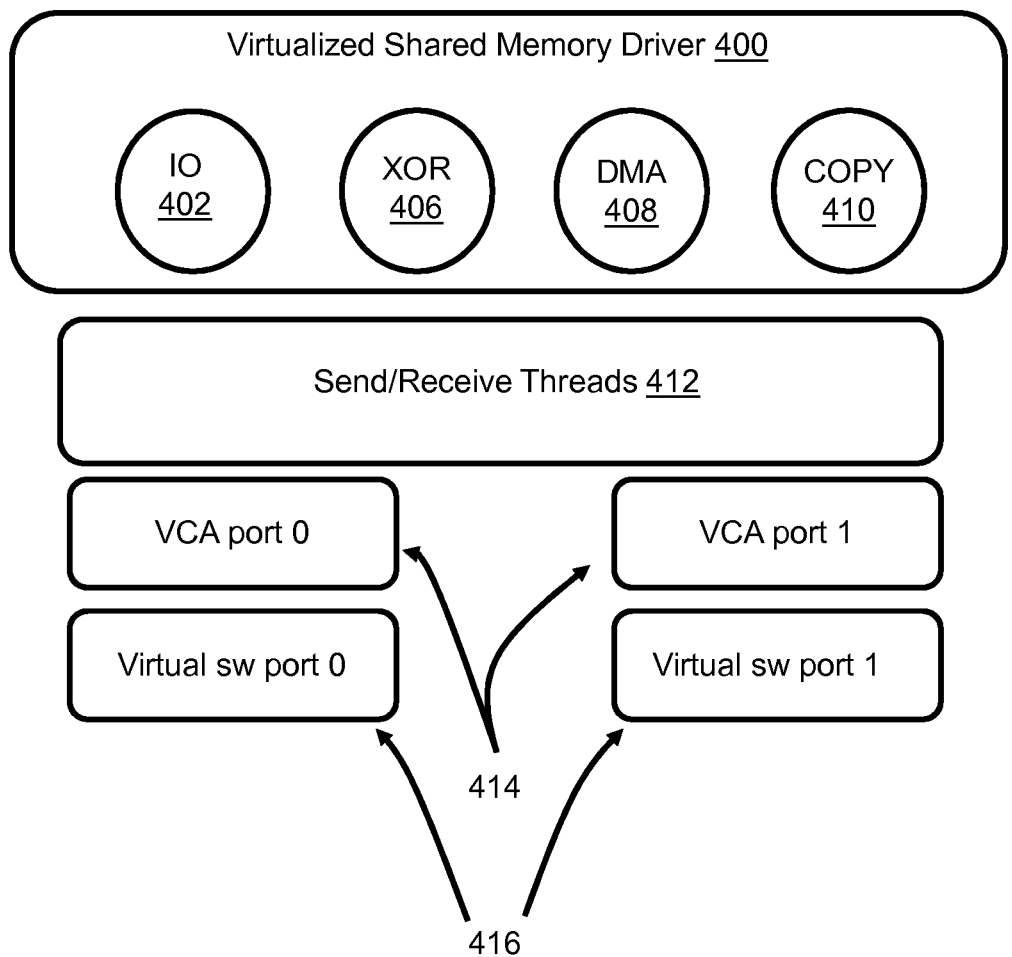
FIG. 4 illustrates a shared memory protocol driver.

Referring to FIG. 4, a virtualized shared memory driver 400 provides DMA (direct memory access) and RDMA (remote DMA) functionality between the virtualized shared memory allocated to different virtual directors. It will be appreciated by those of ordinary skill in the art that the virtualized shared memory of different virtual directors are different allocated portions of the same memory of the storage server. Such an architecture differs from the storage array being emulated. The driver 400 provides IO (input/output) 402, XOR 406, DMA 408 and COPY 410 services for send and receive threads 412 in a manner which emulates a physical storage array in which the directors are implemented on separate printed circuit board blades, each with its own memory components which are shared via an interconnecting fabric switch. The driver utilizes threading techniques to send and receive requests in and out of VCA ports 414 via virtual switch ports 416.

A number of features, aspects, embodiments and implementations have been described. Nevertheless, it will be understood that a wide variety of modifications and combinations may be made without departing from the scope of the inventive concepts described herein. Accordingly, those modifications and combinations are within the scope of the following claims.

What is claimed is:

1. An apparatus comprising:
   a computing node comprising at least one processor and a non-transitory computer-readable memory on which is stored program code configured to be run by the at least one processor to generate a first virtual machine comprising:
      a virtual storage array that accesses host application data stored on one or more non-volatile drives responsive to commands from a host application, the virtual storage array comprising:
         a plurality of virtual storage engines, each virtual storage engine comprising:
            a pair of virtual storage directors interconnected in a failover relationship, each virtual storage director receiving the commands from the host application and configured to communicate with the host application via a virtual front end adapter, each virtual storage director comprising:
               a virtual processor;
               a virtualized shared memory;
               a virtual backend adapter configured to interface with some of the non-volatile drives; and
               a virtual channel adapter that interfaces with other virtual storage directors of other virtual storage engines,
            the pair of virtual storage directors being interconnected via a virtual switch, the virtual processor and the virtualized shared memory implemented as a second virtual machine nested within the first virtual machine;
      whereby host application data requested by a host application from a first virtual storage director of a first virtual storage engine and managed by a second virtual storage director of a second virtual storage engine is provided by the second virtual storage director copying the requested host application from the non-volatile drives to the virtualized shared memory and the first virtual storage director accessing the requested host application data from the virtualized shared memory to provide the requested host application data to the host application that generated the request.

2. The apparatus of claim 1 wherein each virtual storage director further comprises a virtual channel adapter with virtual ports which interface with other virtual storage directors via the virtual switch using Ethernet protocol.

3. The apparatus of claim 1 wherein the virtual front end adapter is configured to interface the virtual storage directors with a guest operating system hosted by the virtual storage array.

4. The apparatus of claim 3 wherein the virtual front end adapter implements internet small computer system interface protocol.

5. The apparatus of claim 1 wherein the computing node processor comprises a central processing unit and a graphics processing unit.

6. The apparatus of claim 1 wherein the virtual storage array further comprises a backend driver configured to enable the virtual storage directors to access a set of virtual drives.

7. The apparatus of claim 6 wherein the virtual drives are mounted on paravirtualized small computer system interface devices.

8. The apparatus of claim 7 wherein the virtual drives are an abstraction layer between the virtual storage directors and a set of physical data storage devices.

9. The apparatus of claim 1 wherein the virtual storage array further comprises a virtualized shared memory driver which provides direct memory access functionality between the virtualized shared memory allocated to the virtual storage directors.

10. The apparatus of claim 1 wherein the virtualized shared memory driver provides emulated input/output, XOR, direct memory access and copy services for send and receive threads.

11. A method comprising:
using a computing node comprising at least one processor and a non-transitory computer-readable memory on which is stored program code configured to be run by the at least one processor:
generating a first virtual machine comprising a virtual storage array that accesses host application data stored on one or more non-volatile drives responsive to commands from a host application, the virtual storage array comprising virtual storage engines, each virtual storage engine comprising a pair of virtual storage directors, interconnected in a failover relationship, that each receive the commands from the host application and is configured to communicate with the host application via a virtual front end adapter, each virtual storage director comprising a virtual processor, a virtualized shared memory, a virtual backend adapter configured to interface with some of the non-volatile drives, and a virtual channel adapter that interfaces with other virtual storage directors of other virtual storage engines, the virtual processor and the virtualized shared memory implemented as a second virtual machine nested within the first virtual machine;
interconnecting the pair of virtual storage directors via a virtual switch; and
providing host application data requested by a host application from a first virtual storage director of a first virtual storage engine and managed by a second virtual storage director of a second virtual storage engine by causing the second virtual storage director to copy the requested host application from the non-volatile drives to the virtualized shared memory and the first virtual storage director accessing the requested host application data from the virtualized shared memory for providing the requested host application data to the host application that generated the request.

12. The method of claim 11 wherein each virtual storage director further comprises a virtual channel adapter with virtual ports, and comprising interfacing the virtual storage directors with other virtual storage directors via the virtual switch via the virtual ports using Ethernet protocol.

13. The method of claim 11 comprising interfacing the virtual storage directors with a guest operating system hosted by the virtual storage array via the virtual front end adapter.

14. The method of claim 13 comprising the virtual front end adapter implementing internet small computer system interface protocol.

15. The method of claim 11 wherein the computing node processor comprises a central processing unit and a graphics processing unit.

16. The method of claim 11 wherein the virtual storage array further comprises a backend driver, and comprising the backend driver enabling the virtual storage directors to access a set of virtual drives.

17. The method of claim 16 comprising mounting the virtual drives on paravirtualized small computer system interface devices.

18. The method of claim 17 comprising implementing the virtual drives as an abstraction layer between the virtual storage directors and a set of physical data storage devices.

19. The method of claim 11 wherein the virtual storage array further comprises a virtualized shared memory driver, and comprising the virtualized shared memory driver providing direct memory access functionality between the virtualized shared memory allocated to the virtual storage directors.

20. The method of claim 11 comprising the virtualized shared memory driver providing emulated input/output, XOR, direct memory access and copy services for send and receive threads.

* * * * *